(12) United States Patent
Cours et al.

(10) Patent No.: US 7,862,383 B2
(45) Date of Patent: Jan. 4, 2011

(54) ELECTRICAL CONNECTOR FOR A SOLAR MODULE ASSEMBLY

(75) Inventors: David Cours, Dalton, PA (US); Scott Schlegel, Mechanicsburg, PA (US); Steve Gherardini, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/477,691

(22) Filed: Jun. 3, 2009

(65) Prior Publication Data

US 2010/0311262 A1 Dec. 9, 2010

(51) Int. Cl.
*H01R 25/00* (2006.01)
(52) U.S. Cl. ...................................... 439/638
(58) Field of Classification Search .................. 439/638, 439/639
See application file for complete search history.

(56) References Cited

U.S. PATENT DOCUMENTS

| | | | |
|---|---|---|---|
| 4,310,211 A | 1/1982 | Bunnell et al. | |
| 4,460,232 A | 7/1984 | Sotolongo | |
| 6,093,884 A | 7/2000 | Toyomura et al. | |
| 6,203,354 B1 | 3/2001 | Kuwahara et al. | |
| 6,337,436 B1 | 1/2002 | Ganz | |
| 6,344,612 B1 | 2/2002 | Kuwahara et al. | |
| 6,582,249 B1 | 6/2003 | Boeck et al. | |
| 6,655,987 B2 | 12/2003 | Higashikozono et al. | |
| 6,840,799 B2 | 1/2005 | Yoshikawa et al. | |
| 7,097,516 B2 * | 8/2006 | Werner et al. | 439/709 |
| 7,134,883 B2 | 11/2006 | Werner et al. | |
| 7,291,036 B1 | 11/2007 | Daily et al. | |
| 7,365,965 B2 * | 4/2008 | Higashikozono et al. | 361/641 |
| 7,387,537 B1 | 6/2008 | Daily et al. | |
| 7,591,690 B1 * | 9/2009 | Chien et al. | 439/709 |
| 2008/0190477 A1 * | 8/2008 | Hattori | 136/246 |
| 2008/0283111 A1 | 11/2008 | Higashikozono et al. | |
| 2009/0260676 A1 * | 10/2009 | McMahon et al. | 136/251 |

* cited by examiner

*Primary Examiner*—Tho D Ta

(57) ABSTRACT

An electrical connector includes a rigid body, cable mating bodies disposed within the body, and contacts joined to the cable mating bodies. The body has an upper side and an opposite mounting side that is configured to be mounted to a first solar module. The body frames a window that extends through the body from the upper side to the mounting side. The cable mating bodies are configured to electrically couple the first solar module with cables to communicate electric current generated in the first solar module with one or more of an electrical load and an additional solar module. The contacts extend into the window of the body and are arranged in the window to mate with the module contacts to electrically couple the first solar module with the cable mating bodies.

21 Claims, 9 Drawing Sheets

ELECTRICAL CONNECTOR FOR A SOLAR MODULE ASSEMBLY

BACKGROUND OF THE INVENTION

The subject matter herein relates generally to electrical connectors and, more particularly, for electrical connectors that couple solar modules with one another.

Solar modules or panels convert incident light into electricity. Known solar modules receive light on one side of the module and convert the light into an electrical potential difference. The electrical potential difference is applied to module contacts positioned at or near an exterior surface of the solar module. An electrical connector is electrically coupled to the module contacts to receive the potential difference. Several electrical connectors mounted to multiple solar modules are joined with one another to combine the electrical potential differences of the solar modules. The potential differences of the solar modules may be combined as an electric current passing through the connectors and modules. The electric current may then be applied to an electric load that uses the current generated by the solar modules to perform one or more operations or actions.

Some known electrical connectors are mounted to the back sides of solar modules to electrically couple the connectors with the solar modules. The connectors may be referred to as solar junction boxes. The connectors may have a relatively large profile, or height. For example, some of the known connectors may extend from the back side of a solar module by a significant amount. With the increasing use of solar modules in tight locations and spaces, the clearance behind the back side of solar modules may be limited. Some known connectors have a profile height that is too large to permit mounting of the connectors to the solar modules in some relatively tight or small locations.

Additionally, some known connectors include cables that extend from the connectors to mate with connectors mounted to other solar modules. The cables of one connector mate with other connectors to electrically join multiple solar modules with one another. The cables, however, can interfere with the automated mounting of the connectors to the solar modules. For example, the dangling cables can interfere with automated pick-and-place systems that pick up and place the connectors to the back sides of solar modules in order to mount the connectors to the solar modules.

The housings or bodies of some known connectors do not include features or components that enable automated systems to position the connectors on the solar modules. For example, the bodies of some known connectors do not include placement features that permit an automated pick-and-place system in an assembly line environment to pick up a connector and mount the connector to the back side of a solar module. Moreover, the contacts of some connectors are not located to allow for automated soldering or welding of the contacts with the module contacts. For example, the contacts in the connectors may be hidden within the connector body. The hidden contacts may inhibit application of solder or a weld to the contacts without requiring an additional step of opening up the connector body.

A need exists to remedy the shortcomings of known solar module connectors in order to more easily permit the automated mounting of solar module connectors to the solar modules.

BRIEF DESCRIPTION OF THE INVENTION

In one embodiment, an electrical connector includes a rigid body, cable mating bodies disposed within the body, and contacts joined to the cable mating bodies. The body has an upper side and an opposite mounting side that is configured to be mounted to a first solar module. The body frames a window that extends through the body from the upper side to the mounting side. The cable mating bodies are configured to electrically couple the first solar module with cables to communicate electric current generated in the first solar module with one or more of an electrical load and an additional solar module. The contacts extend into the window of the body and are arranged in the window to mate with the module contacts to electrically couple the first solar module with the cable mating bodies. Optionally, the body includes ports that are configured to detachably receive the cables coupled to the at least one additional solar module in order to electrically couple the first solar module with the at least one additional solar module. In one embodiment, the body includes opposite ends interconnecting the upper side with the mounting side, with the ports being disposed in the opposite ends. Alternatively, the body includes a common end that interconnects the upper side with the mounting side. The ports may be disposed in this common end.

In another embodiment, another electrical connector includes a rigid body, cable mating bodies disposed within the body, and contacts joined to the cable mating bodies. The body is configured to be mounted to a first solar module that includes module contacts. The body includes ports configured to detachably receive cables coupled to one or more of an electrical load and an additional solar module. The body also includes placement features that are configured to be engaged for automated placement of the rigid body on the first solar module so that the contacts are oriented with the module contacts on the first solar module. The cable mating bodies are configured to be electrically joined with the cables to communicate electric current among the first solar module and the one or more of the electrical load and the additional solar module. The contacts protrude out of the body and are configured to mate with the module contacts to electrically couple the first solar module with the cable mating bodies. Optionally, the body includes a mounting side that is configured to be mounted to the first solar module and an opposite upper side. The placement features may include a flat surface on the upper side that is configured to be engaged using an automated suction force to place the body on the first solar module. Alternatively, the body includes opposite sides extending transverse to the first solar module when the body is mounted thereto. The placement features may include recesses in the opposite sides that are configured to receive extensions of a peripheral device to pick up the rigid body and place the rigid body on the first solar module.

DETAILED DESCRIPTION OF THE INVENTION

Figure 1:
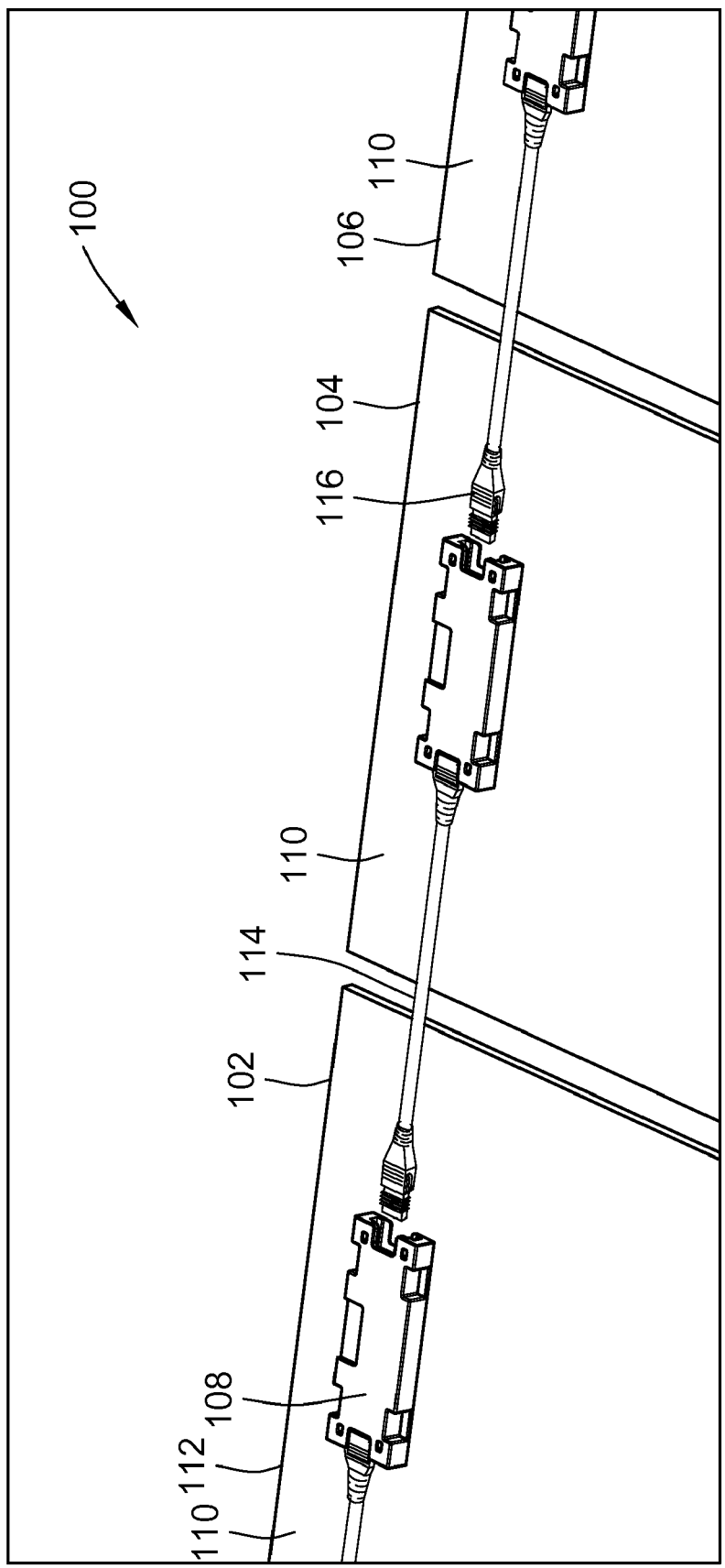
FIG. 1 is a perspective view of a solar module assembly in accordance with one embodiment of the presently described invention.

FIG. 1 is a perspective view of a solar module assembly 100 in accordance with one embodiment of the presently described invention. The solar module assembly 100 includes several solar modules 102, 104, 106. Electrical connectors 108 are electrically joined with and mounted to mounting sides 110 of the solar modules 102, 104, 106. In one embodiment, light that is incident on opposing sides 112 of the solar modules 102-106 is converted into electricity. Alternatively, the connectors 108 may be mounted on the same side 110 or 112 of the solar modules 102, 104, 106 that receives light to convert the light into electricity. The electricity generated by the solar modules 102-106 is communicated to the connectors 108. Several cables 114 interconnect the electrical connectors 108 with one another to permit communication of the generated electricity among the solar modules 102-106. In the embodiment shown in FIG. 1, the cables 114 include plug ends 116. The plug ends 116 are received into the connectors 108 to electrically interconnect the connectors 108 with one another. The cables 114 couple the connectors 108 and the solar modules 102-106 with one another. In the illustrated embodiment, the cables 114 are fitted with LPPV Micro-SOLARLOK® plug connectors. The electricity communicated to the connectors 108 and through the cables 114 may be applied to a peripheral electrical load (not shown), such as an external electrical device (not shown).

Figure 2:
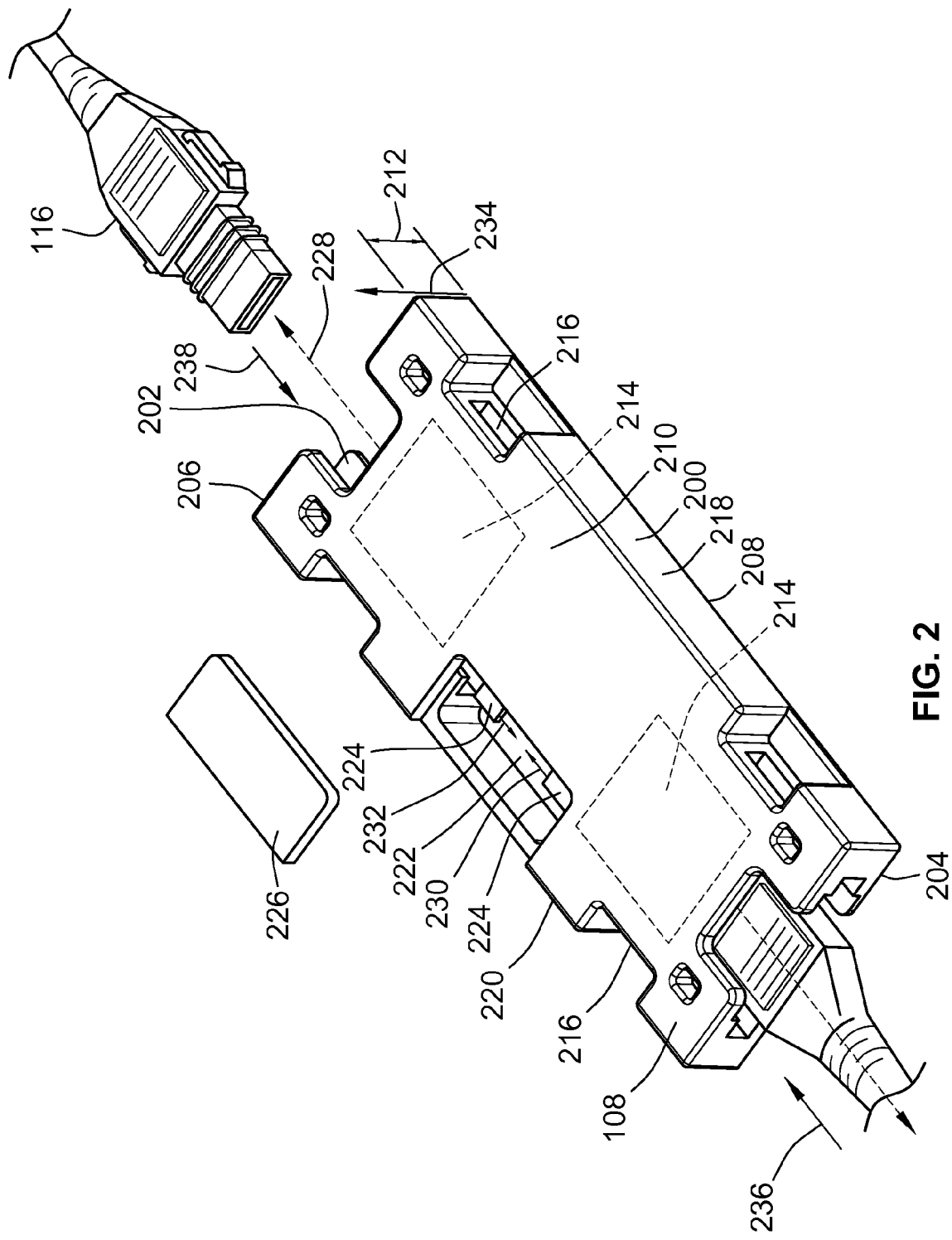
FIG. 2 is an exploded view of an electrical connector shown in FIG. 1 in accordance with one embodiment of the presently described invention.

FIG. 2 is an exploded view of the connector 108 in accordance with one embodiment of the presently described invention. The connector 108 may be referred to as a solar module junction or distribution box. The connector 108 includes a body 200. The body 200 may be molded from a dielectric material, such as a polymer, into a variety of desired shapes and/or sizes. In one embodiment, body 200 is a unitary body that does not include any cables or other flexible or bendable extensions or portions of the connector 108. The body 200 is elongated along a longitudinal axis 228 between opposite ends 204, 206. The ends 204, 206 include ports 202 that are shaped to receive the plug ends 116 of the cables 114 (shown in FIG. 1). The plug ends 116 are the connectors of the cables 114 and are detachably received by the ports 202 of the body 200. For example, the cables 114 may be separated from the connector 108 and be coupled with the connector 108 by remaining and loading the plug ends 116 into the body 200 along respective loading directions 236, 238.

The body 200 includes a mounting side 208 that is affixed to the solar modules 102-106. The mounting side 208 is a substantially planar surface in one embodiment. The body 200 includes an upper side 210 disposed opposite of the mounting side 208. In the illustrated embodiment, the upper side 210 includes a substantially planar surface that is approximately parallel to the mounting side 208. Opposite sides 218, 220 of the body 200 extend from the mounting side 208 to the upper side 210 and from one end 204 to the opposite end 206. The opposite ends 204, 206 and opposite sides 218, 220 interconnect the upper side 210 with the mounting side 208. In the illustrated embodiment, the opposite sides 218, 220 are approximately parallel to each other and are approximately perpendicular to the upper side 210, the mounting side 208, and the ends 204, 206.

The profile height, or height dimension 212, of the connector 108 is the distance between the mounting side 208 and the upper side 210 of the body 200 in a height direction 234. The height direction 234 extends transverse to the mounting side 208 and the upper side 210. In one embodiment, the height direction 234 is approximately perpendicular to the mounting side 208 and the upper side 210. By way of example only, the height dimension 212 may be approximately 10 millimeters or less. In another embodiment, the height dimension 212 is approximately 8 millimeters or less. Other height dimensions 212 may be used in connection with one or more embodiments of the presently described invention. The relatively small height dimension 212 of the connectors 108 enables the connectors 108 to be installed in relatively small or tight locations on the solar modules 102-106 (shown in FIG. 1). For example, the connectors 108 may be used with solar modules 102-106 where the clearance between the mounting side 110 (shown in FIG. 1) of the solar modules 102-106 and the objects or devices to which the solar modules 102-106 are mounted is only slightly greater than the height dimension 212. Additionally, the relatively small height dimension 212 may allow for a flat or hidden away installation of the connectors 108 where the solar modules 102-106 are installed as solar roof tiles, solar thin-film applications, and the like.

The body 200 includes placement features that are engaged by an external automated placement system (not shown) for automated placement of the body 200 on the solar module 102-106 (shown in FIG. 1). The placement features may be used by the automated system, such as a robotic or other mechanized apparatus, to pick up and place the body 200 onto the solar modules 102-106 in an assembly line manufacturing environment. In one embodiment, the placement features include suction surfaces 214 on the upper side 210. The suction surfaces 214 constitute substantially flat portions of the upper side 210. The suction surfaces 214 may be engaged to pick up and move the body 200 from one location to another using a suction force. The suction force is applied by a suction cup (not shown) or other device. For example, an automated system (not shown) may apply a suction force to the suction surfaces 214 to pick up the connector 108 and place the connector 108 on the mounting side 110 (shown in FIG. 1) of the solar modules 102-106. In one embodiment, the suction surfaces 214 do not include any recesses, protrusions, or other features that interfere with application of a suction force to the suction surfaces 214.

The placement features may include recesses 216 disposed in the body 200. The recesses 216 (shown in FIG. 2) extend inward into the body 200 from the opposite sides 218, 220. While four recesses 216 are shown in FIG. 2, a different number of recesses 216 may be provided. Alternatively, the recesses 216 may be provided in a different location of the body 200. For example, one or more of the upper side 210, mounting side 208, and opposite ends 204, 206 may include the recesses 216. The recesses 216 are shaped to receive fingers or other protrusions (not shown) of a peripheral device (not shown). The peripheral device may include, for example, a robotic hand or other automated device that picks up the body 200 and places the body 200 onto a solar module 102-106 (shown in FIG. 1).

The body 200 frames a window 222 in the connector 108. As shown in FIG. 2, the window 222 extends through the height dimension 212 of the body 200 from the upper side 210 to the mounting side 208. Several contacts 224 extend from the body 200 into the window 222. While the embodiment shown and discussion herein refers to the contacts as contact tabs 224, the contacts may be embodied in another shape or orientation. For example, the contact tabs 224 may be embodied in plates, posts, contact receptacles, and the like. In one embodiment, the contact tabs 224 are joined to one or more electrical components 500 (shown in FIG. 5) that are disposed within the body 200. Alternatively, the electrical components 500 are not included in the body 200. The contact tabs 224 are electrically coupled with module contacts 400, 402 that are integral with the solar modules 102-106 (shown in FIG. 1). The contact tabs 224 establish an electrically conductive pathway between the solar modules 102-106 and the electrical component 500. The plug ends 116 of the cables 114 (shown in FIG. 1) are electrically coupled with the contact tabs 224. The cables 114 electrically join the solar modules 102-106 with one another, as described above. Positioning the contact tabs 224 in the window 222 permits an automated system to weld or solder the contacts tabs 224 to the module contacts 400-402 without requiring the body 200 to be opened up after mounting the body 200 to the solar modules 102-106.

The contact tabs 224 extend from the body 200 in the window 222 in opposing longitudinal directions 230, 232 toward one another. In the illustrated embodiment, the longitudinal directions 230, 232 are parallel to the loading directions 236, 238 in which the plug ends 116 are loaded into the ports 202. For example, the plug end 116 nearest one of the contact tabs 224 is loaded into the port 202 in the loading direction 236, which is approximately parallel to the longitudinal direction 230 that the contact tab 224 extends from the body 200. Similarly, the other plug end 116 shown in FIG. 2 is loaded into the port 202 in the loading direction 238 with the corresponding contact tab 224 extending from the body in the longitudinal direction 232. The arrangement of the contact tabs 224 extending from the body 200 in longitudinal directions 230, 232 that are parallel to the loading directions 236, 238 of corresponding plug ends 116 may be referred to as an in-line arrangement of the connector 108.

The contact tabs 224 are configured to engage the module contacts 400, 402 (shown in FIG. 4) of the solar modules 102-106 (shown in FIG. 1) within the space defined by the window 222. The body 200 surrounds the window 222 and the contact tabs 224 such that an encapsulant (not shown) may be placed in the window 222 to enclose or encapsulate the contact tabs 224 within the body 200. For example, one or more of a polymer, epoxy, potting compound, and the like, may be placed within the volume enclosed by the body 200 in the window 222 to seal the contact tabs 224 between the solar modules 102-106 and the body 200 after the contact tabs 224 are soldered or welded to the module contacts 400, 402. A cover 226 may be placed over the window 222 to enclose the contact tabs 224 within the window 222 between the body 200 and the solar modules 102-106.

Figure 3:
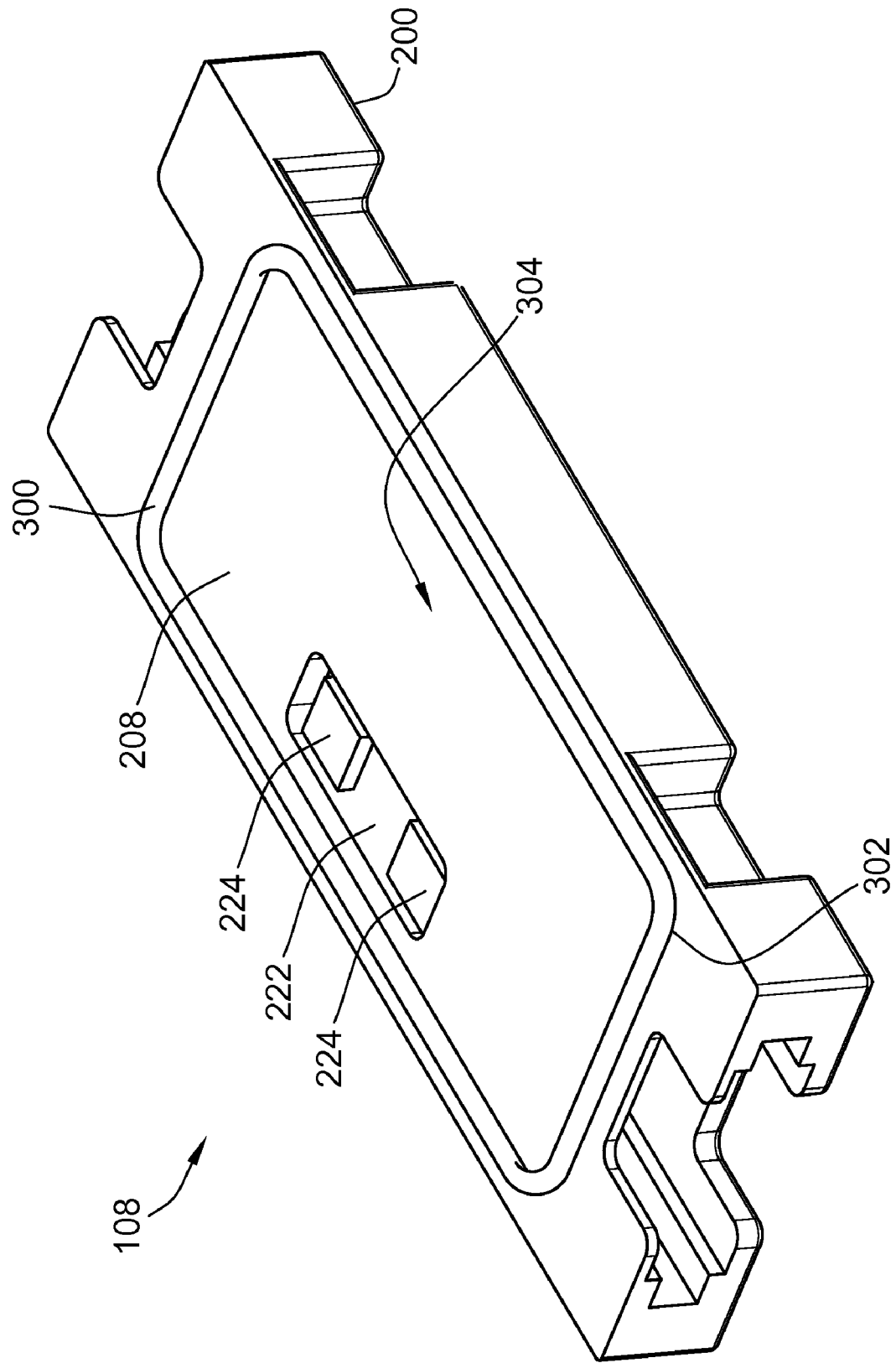
FIG. 3 is a perspective view of a mounting side of the connector shown in FIG. 1 in accordance with one embodiment of the presently described invention.

FIG. 3 is a perspective view of the mounting side 208 of the connector 108 in accordance with one embodiment of the presently described invention. As shown in FIG. 3, the contact tabs 224 extend into the window 222 such that the contact tabs 224 are approximately coplanar with the mounting side 208. Providing the contact tabs 224 in a coplanar relationship with the mounting side 208 may enable an automated soldering or welding system to automatically solder or weld the contact tabs 224 with the module contacts 400, 402 (shown in FIG. 4) without having to first adjust the height of the contact tabs 224 above the solar module 102-106 (shown in FIG. 1).

The mounting side 208 includes a sealing element 300 extending around a mounting area 304 of the connector 108. The mounting area 304 is an area of the mounting side 208 of the connector 108 that encompasses the contact tabs 224. The sealing element 300 may include an elastomeric adhesive that encircles the contact tabs 224. The mounting side 208 includes a channel 302 in the illustrated embodiment. The channel 302 is a recess extending into the body 200 that is shaped to receive the sealing element 300. The sealing element 300 is dispensed into the channel 302 around the contact tabs 224. The sealing element 300 is deformed upon assembly between the connector 108 and the solar module 102-106 (shown in FIG. 1) when the connector 108 is mounted to the solar module 102-106. The sealing element 300 provides adhesion and sealing of the mounting area 304 to prevent ingress of contaminants such as moisture, dust, dirt, and the like, from entering into the mounting area 304 between the connector 108 and the solar module 102-106. For example, the sealing element 300 prevents moisture from reaching the contact tabs 224.

Figure 4:
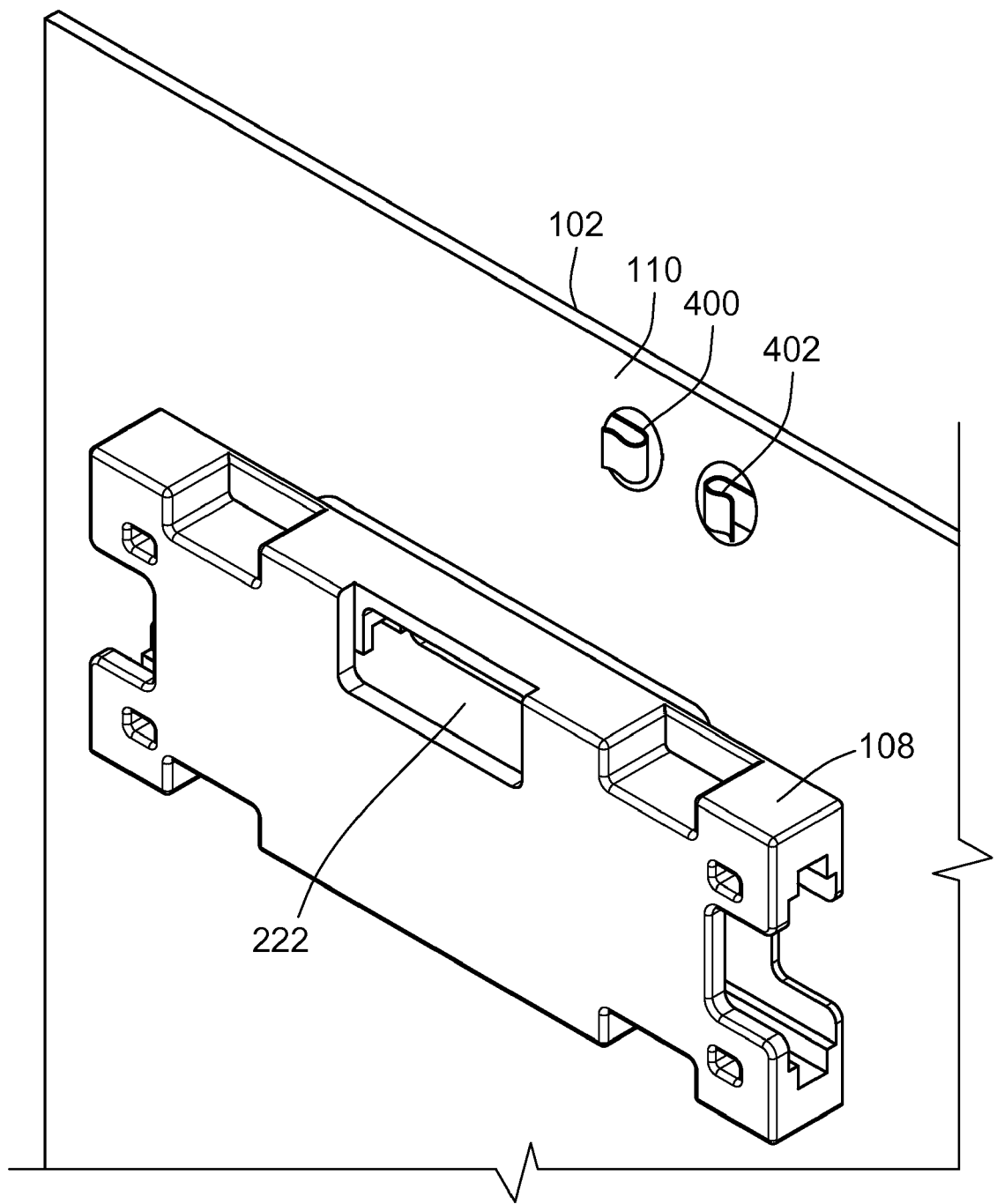
FIG. 4 is a perspective view of the connector shown in FIG. 1 and a solar module also shown in FIG. 1 in accordance with one embodiment of the presently described invention.

FIG. 4 is a perspective view of the connector 108 and a solar module 102 prior to mounting the connector 108 to the solar module 102. The mounting side 110 of the solar module 102 includes the module contacts 400, 402. The module contacts 400, 402 engage the contact tabs 224 (shown in FIG. 2) of the connector 108 to electrically couple the connector 108 with the solar module 102. In the illustrated embodiment, the module contacts 400, 402 are conductive films folded over in a C- or U-shape. The module contacts 400, 402 are folded away from one another in opposite directions in FIG. 4. Alternatively, the module contacts 400, 402 may have a different shape or may be folded in direction other than those shown in the illustrate embodiment.

Each of the contact tabs 224 (shown in FIG. 2) engages the corresponding module contact 400, 402. The contact tabs 224 are soldered to the module contacts 400, 402 to fix and secure the contact tabs 224 to the module contacts 400, 402. As described above, an automated system (not shown) may pick up and place the connector 108 onto the mounting side 110. The window 222 enables the solder or weld to be automatically applied to the contact tabs 224 and module contacts 400, 402. For example, after the automated system has placed the connector 108 onto the mounting side 110 of the solar module 102, the solder or weld can be applied to the contact tabs 224 without first opening up or other wise moving the body 200.

Figure 5:
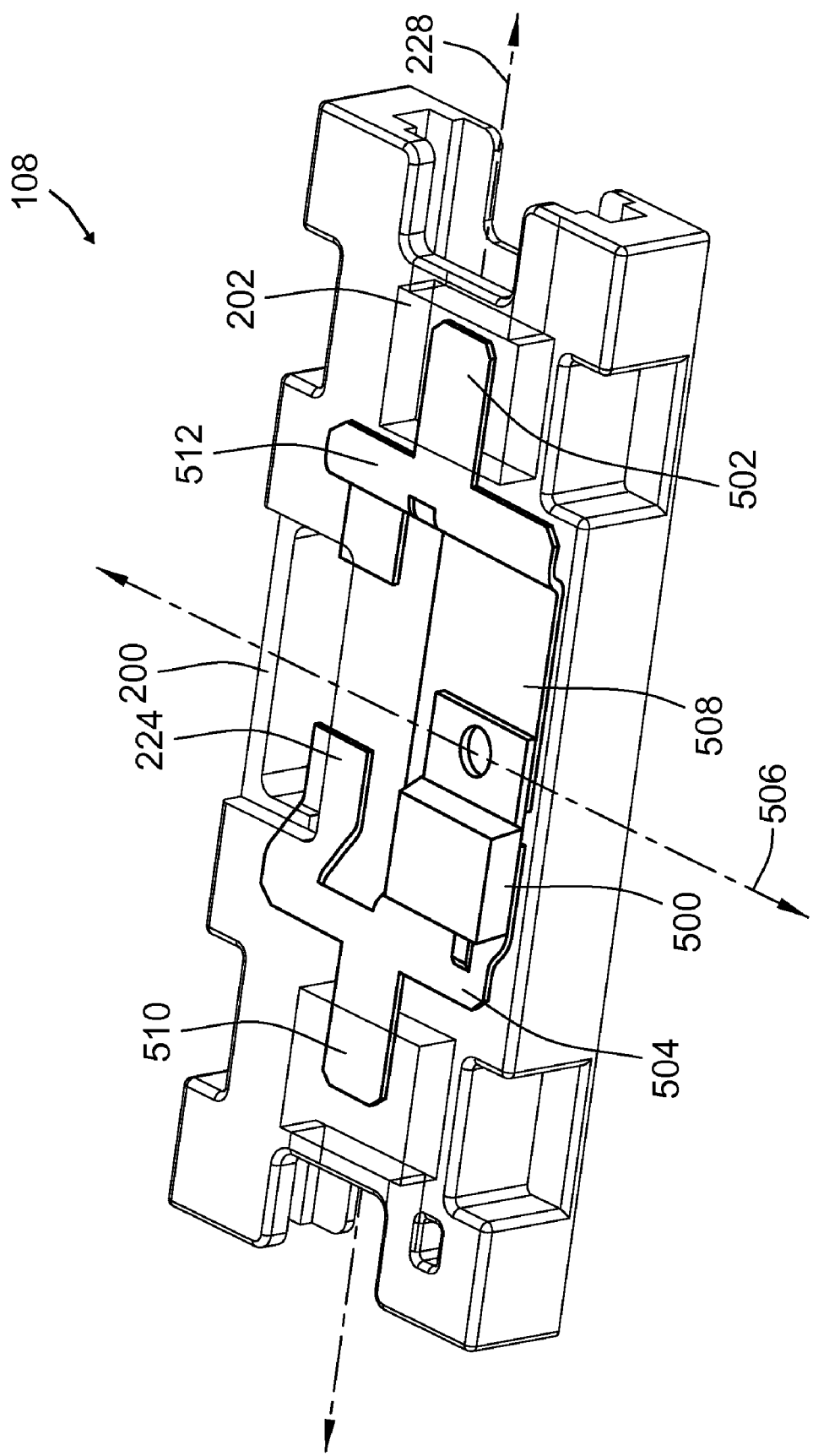
FIG. 5 is another perspective view of the connector shown in FIG. 1 in accordance with one embodiment of the presently described invention.

FIG. 5 is a perspective view of the connector 108 in accordance with one embodiment of the presently described invention. The body 200 of the connector 108 is illustrated in phantom in FIG. 5. The electronic component 500 is disposed within the body 200 and receives electricity generated in the solar module 102-106 (shown in FIG. 1). The electrical component 500 also receives electricity from other solar modules 102-106 to which the electronic component 500 is joined via the cables 114 (shown in FIG. 1). For example, the electronic component 500 communicates electric current generated by the solar module 102-106 to which the connector 108 is mounted with one or more additional solar modules 102-106. The electronic component 500 is a diode in one embodiment. For example, the electronic component 500 may be a diode that permits electric current to pass in a single direction through the connector 108. Alternatively, the body 200 may not include the electrical component 500.

Cable mating bodies 502, 510 protrude into the ports 202 in directions parallel to the longitudinal axis 228 of the body 200. The cable mating bodies 502, 510 are shaped and positioned in order to be received in the plug ends 116 (shown in FIG. 1) of the cables 114 (shown in FIG. 1). The cable mating bodies 502, 510 are formed as a substantially planar conductive body. Alternatively, the cable mating bodies 502, 510 may be dielectric bodies that are at least partially coated with a conductive material. Each of the cable mating bodies 502, 510 is joined with a conductive bridge 504, 512. The conductive bridges 504, 512 are conductive bodies that electrically join the cable mating bodies 502, 510 with the contact tabs 224 and, in embodiments where an electrical component 500 is included, with the electrical component 500. For example, the conductive bridges 504, 512 may be sheets of a conductive material, such as a metal. Alternatively, the conductive bridges 504, 512 may be dielectric bodies that are at least partially coated with a conductive material. The conductive bridges 504, 512 are elongated transverse to the longitudinal axis 228 of the body 200 and approximately parallel to a lateral axis 506. In the illustrated embodiment, the longitudinal and lateral axes 228, 506 are approximately perpendicular to one another.

The cable mating bodies 502, 510 and contact tabs 224 are offset from one another in directions parallel to the lateral axis 506. For example, the cable mating body 502 and the contact tab 224 that are joined to the conductive bridge 512 are not aligned with one another in a direction parallel to the longitudinal axis 228. In another example, the cable mating body 510 and the contact tab 224 that are joined to the conductive bridge 504 are not aligned with one another in a direction along the longitudinal axis 228.

A conductive pathway member 508 couples the conductive bridge 512 with the electrical component 500. Alternatively, the conductive pathway member 508 may join the conductive bridge 512 with the conductive bridge 504. The conductive pathway member 508 is a substantially planar conductive body, such as a stamped and formed sheet of metal. Alternatively, the conductive pathway member 508 is a dielectric body that is at least partially coated with a conductive material. The conductive pathway member 508 provides a conductive pathway between the conductive bridge 512 and the electrical component 500, in one embodiment, or between the conductive bridge 512 and the conductive bridge 504 in another embodiment. In the illustrated embodiment, the conductive pathway member 508 extends from the conductive bridge 512 in a direction parallel to the longitudinal axis 228 and the direction in which one of the contact tabs 224 extends from the same conductive bridge 512. The conductive pathway member 508 is offset from the cable mating body 502 in a direction parallel to the lateral axis 506. For example, the conductive pathway member 508 is offset from the cable mating body 502 such that the conductive pathway member 508 and the cable mating body 502 are not aligned with one another in a direction along the longitudinal axis 228.

The cable mating body 502, the conductive bridge 512, the contact tab 224 joined to the conductive bridge 512, and the conductive pathway member 508 may be a unitary conductive body. For example, the cable mating body 502, contact tab 224, conductive bridge 512 and conductive pathway member 508 may be stamped and formed from a common sheet of conductive material. Similarly, the cable mating body 510, conductive bridge 504, and the contact tab 224 joined to the conductive bridge 504 may be a unitary body. The body 200 may be overmolded onto and around one or more of the cable mating bodies 502, 510, the conductive bridges 504, 512, the electrical component 500 and the conductive pathway member 508.

Figure 6:
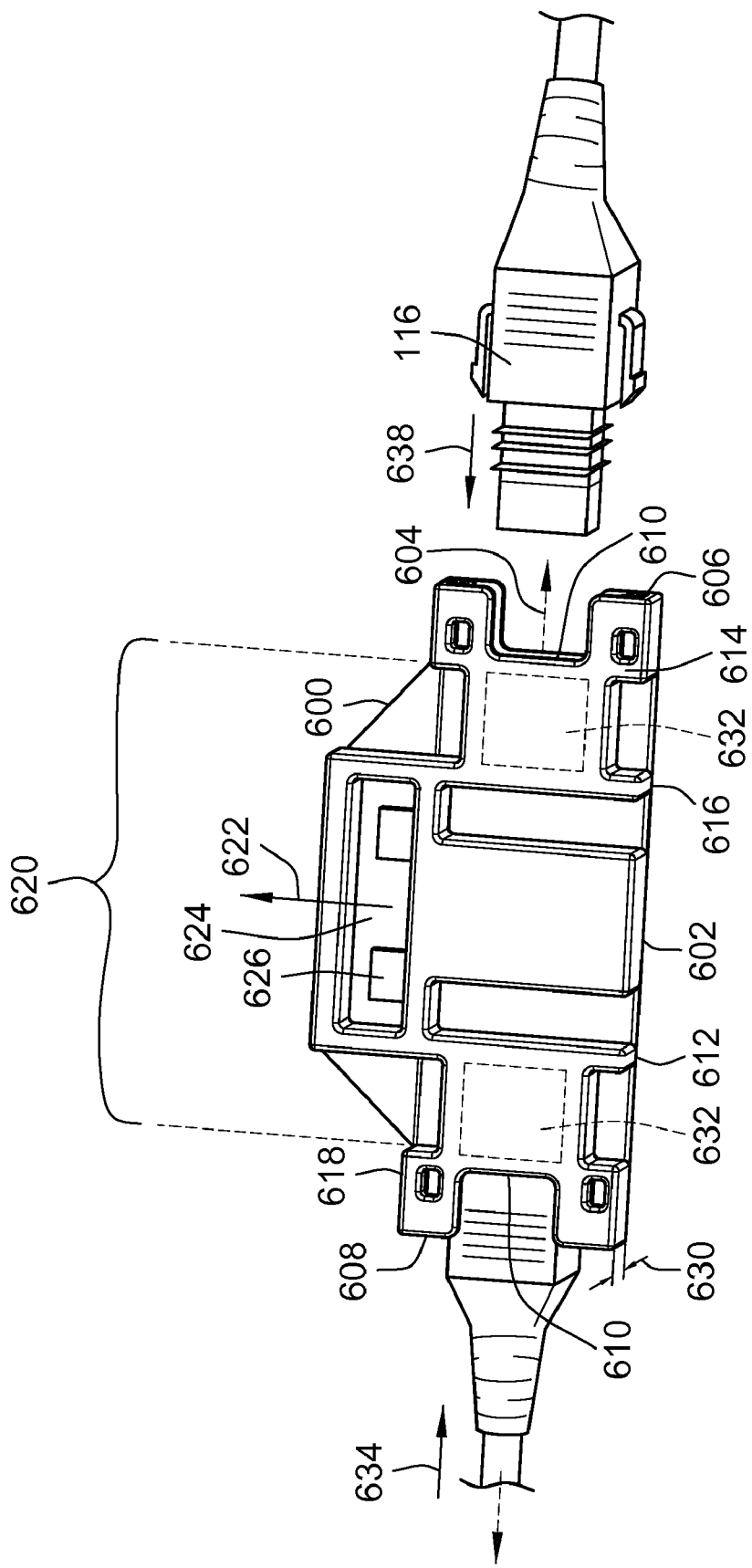
FIG. 6 is a perspective view of an electrical connector in accordance with another embodiment of the presently described invention.

FIG. 6 is a perspective view of an electrical connector 600 in accordance with another embodiment of the presently described invention. The connector 600 is similar to the connector 108 (shown in FIG. 1). For example, the connector 600 is mounted to the mounting side 110 (shown in FIG. 1) of a solar module 102-106 (shown in FIG. 1) to electrically couple the connector 600 with the solar module 102-106. The connector 600 detachably mates with the plug ends 116 of cables 114 (shown in FIG. 1) to join the connector 600 with other connectors 108, 600 joined to other solar modules 102-106 and/or to an external electrical load, such as a battery (not shown).

The connector 600 includes a rigid body 602. The body 602 may be molded from a dielectric material, such as a polymer, into a variety of desired shapes and/or sizes. In one embodiment, the body 602 is a unitary body that does not include any cables or other flexible or bendable extensions or portions of the connector 600. The body 602 is elongated along a longitudinal axis 604 between opposite ends 606, 608. The ends 606, 608 include ports 610 that are shaped to receive the plug ends 116 of the cables 114 (shown in FIG. 1). The plug ends 116 are loaded into the connector 600 in loading directions 628, 634 that extend parallel to the longitudinal axis 604.

The body 602 includes a mounting side 612 that is mounted to the mounting side 110 (shown in FIG. 1) of the solar modules 102-106. The mounting side 612 is a substantially planar surface in one embodiment. An upper side 614 of the body 602 is disposed opposite of the mounting side 612. In the illustrated embodiment, the upper side 614 is approximately parallel to the mounting side 612. The upper side 614 and mounting side 612 are interconnected with one another by the opposite ends 606, 608. Opposite sides 616, 618 of the body 602 extend from the mounting side 612 to the upper side 614 and from one end 606 to the opposite end 608. The side 618 includes a window portion 620 that projects from the side 618 in a lateral direction 622 that is transverse to the longitudinal axis 604. For example, the window portion 620 may project from the side 618 in a direction that is perpendicular to the longitudinal axis 604.

The window portion 620 of the body 602 frames a window 624. The window 624 extends through the body 602 from the upper side 614 to the mounting side 612. Several contact tabs 626 extend from the body 602 into the window 624 in parallel directions. The contact tabs 626 protrude from the body 602 in a direction parallel to the lateral direction 622. The contact tabs 626 may be disposed in a coplanar relationship with the mounting side 612 of the body 602. Similar to the contact tabs 224 (shown in FIG. 2), the contact tabs 626 are joined to an electrical component 700 (shown in FIG. 7) that is disposed within the body 602. Alternatively, the electrical component 700 may not be included in the body 602. The contact tabs 626 are electrically coupled with module contacts (not shown) on the mounting sides 110 (shown in FIG. 1) of the solar modules 102-106 (shown in FIG. 1). For example, the contact tabs 626 may mate with the module contacts 400, 402 (shown in FIG. 4). The contact tabs 626 establish an electrically conductive pathway between the solar modules 102-106 and the electrical component 700. The plug ends 116 of the cables 114 (shown in FIG. 1) are electrically coupled with the contact tabs 626. The cables 114 electrically join the solar modules 102-106 with one another, as described above.

The contact tabs 626 extend from the body 602 in directions that are transverse to the loading directions 628, 634. In the illustrated embodiment, the contact tabs 626 extend from the body 602 in directions perpendicular to the loading directions 628, 634. The arrangement of the contact tabs 626 extending from the body 602 transverse to the loading directions 628, 634 may be referred to as a right angle arrangement of the connector 600. Similar to the contact tabs 224 (shown in FIG. 2), the contact tabs 626 are configured to engage the module contacts 400, 402 (shown in FIG. 4) of the solar modules 102-106 (shown in FIG. 1) within the space defined by the window 624. An encapsulant (not shown) may be placed in the window 624 to enclose or encapsulate the contact tabs 626. A cover (not shown) similar to the cover 226 (shown in FIG. 2) may be placed over the window 624 to enclose the contact tabs 626 within the window 624.

A height dimension 630 of the connector 600 is the distance between the mounting side 612 and the upper side 614 of the body 602 in a direction that extends transverse to the mounting side 612 and the upper side 614. In one embodiment, the height dimension 630 is measured in a direction approximately perpendicular to the mounting side 612 and the upper side 614. By way of example only, the height dimension 630 may be approximately 10 millimeters or less. In another embodiment, the height dimension 630 is approximately 8 millimeters or less.

Similar to the body 200 (shown in FIG. 2), the body 602 includes placement features that are engaged by an external placement system (not shown) for automated placement of the body 602 on the solar module 102-106 (shown in FIG. 1). In one embodiment, the placement features include suction surfaces 632 on the upper side 614. The suction surfaces 632 constitute substantially flat portions of the upper side 614. The suction surfaces 632 may be engaged to pick up and move the body 602 from one location to another using a suction force. In one embodiment, the suction surfaces 632 do not include any recesses, protrusions, or other features that interfere with application of a suction force to the suction surfaces 632.

Figure 7:
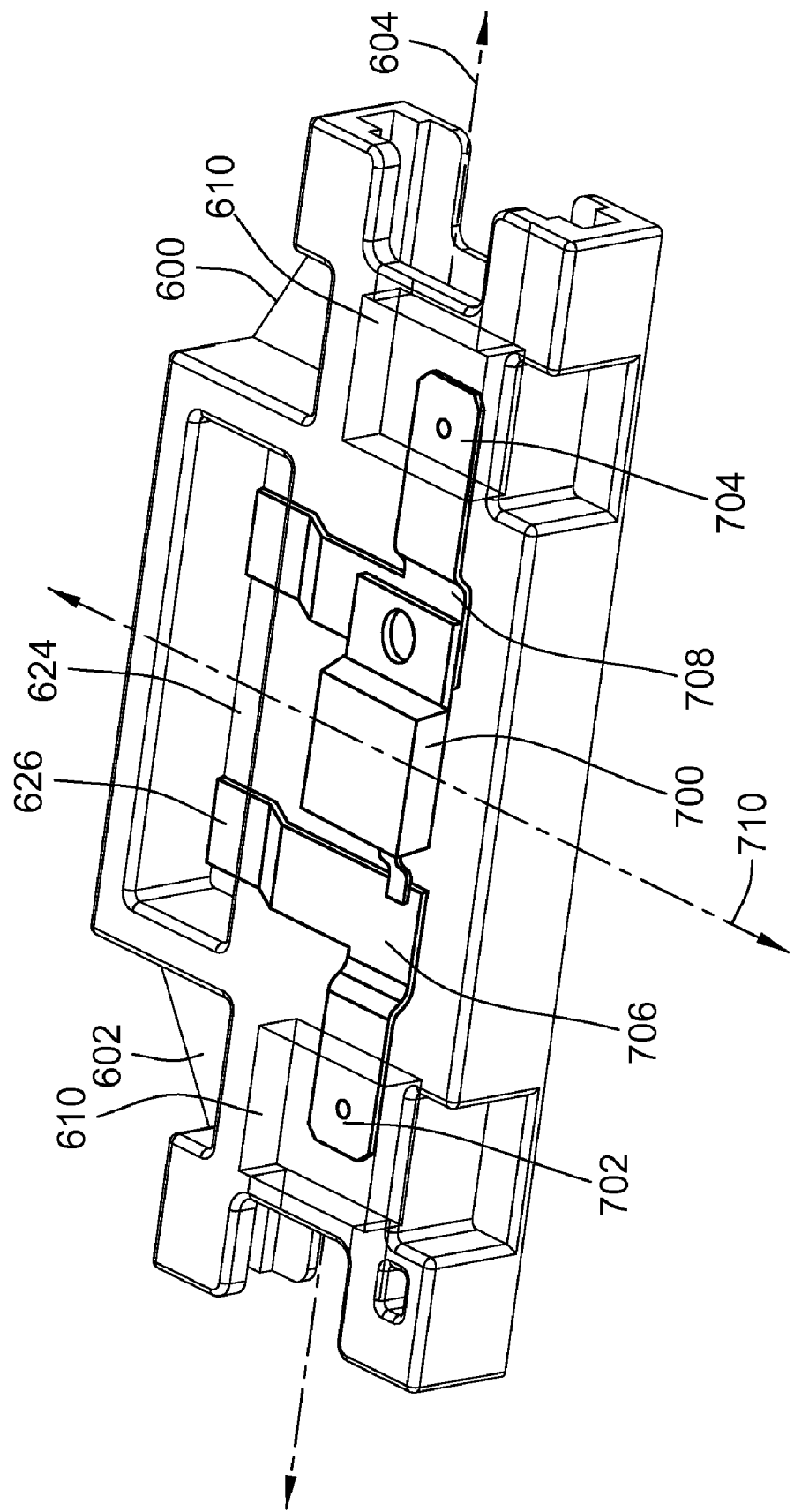
FIG. 7 is a perspective view of the connector shown in FIG. 6 in accordance with one embodiment of the presently described invention.

FIG. 7 is a perspective view of the connector 600 in accordance with one embodiment of the presently described invention. The body 602 of the connector 600 is illustrated in phantom in FIG. 7 to show the electronic component 700 in the body 602. The electronic component 700 may be similar to the electronic component 500 (shown in FIG. 5). For example, the electronic component 700 may be a diode. Alternatively, the body 602 may not include the electronic component 700. Cable mating bodies 702, 704 protrude into the ports 610 in directions parallel to the longitudinal axis 604 of the body 602. The cable mating bodies 702, 704 may be formed and shaped similar to the cable mating bodies 502, 510 (shown in FIG. 5) in order to be received in the plug ends 116 (shown in FIG. 1) of the cables 114 (shown in FIG. 1). The cable mating bodies 702, 704 are joined with conductive bridges 706, 708. Similar to the conductive bridges 504, 512, the conductive bridges 706, 708 are conductive bodies that electrically join the cable mating bodies 702, 704 with the contact tabs 626 and with the electrical component 700. The conductive bridges 706, 708 are elongated transverse to the longitudinal axis 604 and approximately parallel to a lateral axis 710. In the illustrated embodiment, the longitudinal and lateral axes 604, 710 are approximately perpendicular to one another.

The cable mating bodies 702, 704 and contact tabs 626 are oriented transverse from one another. For example, the cable mating bodies 702, 704 are elongated along the longitudinal axis 604 while the contact tabs 626 extend from the body 602 parallel to the lateral axis 710. As shown in FIG. 7, the contact tabs 626 may be formed as the portion of the conductive bridges 706, 708 that extend out of the body 602 and into the window 624.

The cable mating body 702, conductive bridge 706, and one of the contact tabs 626 may be a unitary conductive body. For example, cable mating body 702, conductive bridge 706, and one of the contact tabs 626 may be stamped and formed from a common sheet of conductive material. Similarly, the cable mating body 704, conductive bridge 708, and the other contact tab 626 may be a unitary body. The body 602 may be overmolded onto and around the cable mating bodies 702, 704, the conductive bridges 706, 708, and the electrical component 700.

Figure 8:
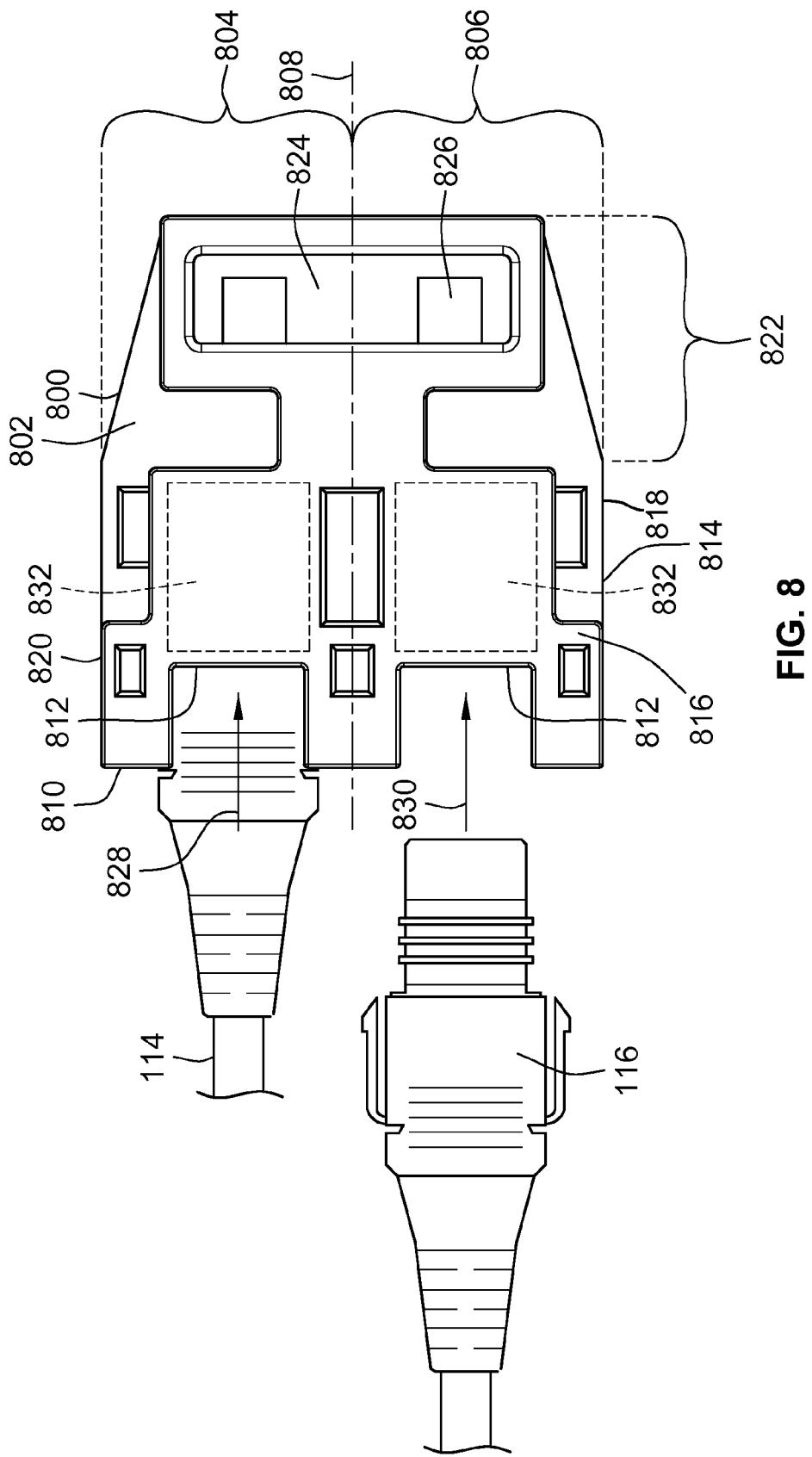
FIG. 8 is a perspective view of an electrical connector in accordance with another embodiment of the presently described invention.

FIG. 8 is a perspective view of an electrical connector 800 in accordance with another embodiment of the presently described invention. The connector 800 is similar to the connectors 108, 600 (shown in FIGS. 1 and 6). For example, the connector 800 is mounted to the mounting side 110 (shown in FIG. 1) of a solar module 102-106 (shown in FIG. 1) to electrically couple the connector 800 with the solar module 102-106. The connector 800 detachably mates with the plug ends 116 of cables 114 to join the connector 800 with connectors 108, 600, 800 joined to other solar modules 102-106 and/or to an external electrical load (not shown).

The connector 800 includes a rigid body 802. The body 802 may be molded from a dielectric material, such as a polymer, into a variety of desired shapes and/or sizes. In one embodiment, the body 802 is a unitary body that does not include any cables or other flexible or bendable extensions or portions of the connector 800. The body 802 includes two similar halves 804, 806 on opposite sides of a dividing line 808. A common end 810 of the body 802 includes ports 812 that are shaped to receive the plug ends 116 of the cables 114, similar to the ports 202 (shown in FIG. 2). In the illustrated embodiment, one port 812 is provided in each half 804, 806 of the body 802. The plug ends 116 are loaded into the ports 812 along loading directions 828, 830. The loading directions 828, 830 are approximately parallel to one another and to the dividing line 808.

The body 802 includes a mounting side 814 that is affixed to the mounting side 110 (shown in FIG. 1) of the solar modules 102-106. The mounting side 814 is a substantially planar surface in one embodiment. An upper side 816 of the body 802 is disposed opposite of the mounting side 814. The upper side 816 and mounting side 814 are interconnected by the common end 810. In the illustrated embodiment, the upper side 816 is approximately parallel to the mounting side 814. Opposite sides 818, 820 of the body 802 extend from the mounting side 814 to the upper side 816.

A window portion 822 is disposed opposite the common end 810 and includes a window 824 similar to the windows 222 and 624 (shown in FIGS. 2 and 6). The window 824 extends through the body 802 from the upper side 816 to the mounting side 814. Several contact tabs 826 extend from the body 802 into the window 824 in parallel directions. The contact tabs 826 extend from the body 802 in directions parallel to dividing line 808. The contact tabs 826 are disposed in a coplanar relationship with the mounting side 814 in one embodiment. Similar to the contact tabs 224 and 626 (shown in FIGS. 2 and 6), the contact tabs 826 are joined to an electrical component 900 (shown in FIG. 9) that is disposed within the body 802. The contact tabs 826 are electrically coupled with module contacts (not shown) on the mounting sides 110 (shown in FIG. 1) of the solar modules 102-106 (shown in FIG. 1). For example, the contact tabs 826 may mate with the module contacts 400, 402 (shown in FIG. 4). The contact tabs 826 establish an electrically conductive pathway between the solar modules 102-106 and the electrical component 900. The plug ends 116 of the cables 114 (shown in FIG. 1) are electrically coupled with the contact tabs 826. The cables 114 electrically join the solar modules 102-106 with one another, as described above.

The contact tabs 826 extend from the body 802 in directions that are parallel to the loading directions 828, 830. The arrangement of the contact tabs 826 extending from the body 802 parallel to the loading directions 828, 830 may be referred to as a parallel or straight arrangement of the connector 800. Similar to the contact tabs 224 and 626 (shown in FIGS. 2 and 6), the contact tabs 826 are configured to engage the module contacts 400, 402 (shown in FIG. 4) of the solar modules 102-106 (shown in FIG. 1) within the space defined by the window 824. An encapsulant (not shown) may be placed in the window 824 to enclose or encapsulate the contact tabs 826 after the contact tabs 826 are terminated to the module contacts 400, 402. A cover (not shown) similar to the cover 226 (shown in FIG. 2) may be placed over the window 824 to enclose the contact tabs 826 within the window 824.

Similar to the bodies 200 and 602 (shown in FIGS. 2 and 6), the body 802 includes placement features that are engaged by an external placement system (not shown) for automated placement of the body 802 on the solar module 102-106 (shown in FIG. 1). In one embodiment, the placement features include suction surfaces 832 on the upper side 816. The suction surfaces 832 constitute substantially flat portions of the upper side 816. The suction surfaces 832 may be engaged to pick up and move the body 802 from one location to another using a suction force. In one embodiment, the suction surfaces 832 do not include any recesses, protrusions, or other features that interfere with application of a suction force to the suction surfaces 832.

Figure 9:
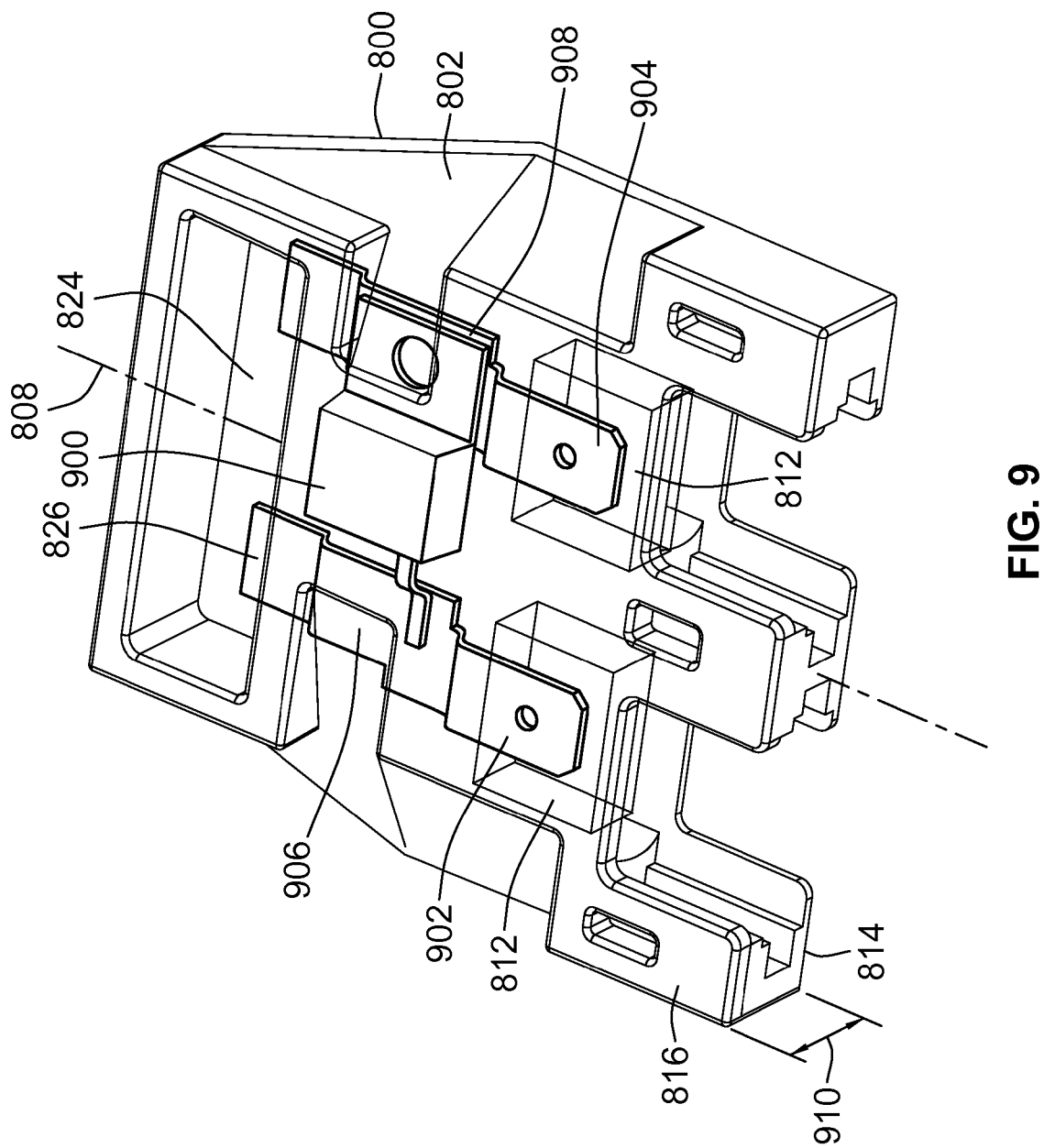
FIG. 9 is a perspective view of the connector shown in FIG. 8 in accordance with one embodiment of the presently described invention.

FIG. 9 is a perspective view of the connector 800 in accordance with one embodiment of the presently described invention. The body 802 of the connector 800 is illustrated in phantom in FIG. 9 to show the electronic component 900 in the body 802. The electronic component 900 may be similar to the electronic components 500, 700 (shown in FIGS. 5 and 7). For example, the electronic component 900 may be a diode. Cable mating bodies 902, 904 protrude into the ports 812 in directions parallel to the dividing line 808 of the body 802. The cable mating bodies 902, 904 may be formed and shaped similar to the cable mating bodies 502, 510 (shown in FIG. 5) in order to be received in the plug ends 116 (shown in FIG. 1) of the cables 114 (shown in FIG. 1). The cable mating bodies 902, 904 are joined with conductive bridges 906, 908. Similar to the conductive bridges 504, 512, the conductive bridges 906, 908 are conductive bodies that electrically join the cable mating bodies 902, 904 with the contact tabs 826 and with the electrical component 900. The conductive bridges 906, 908 are elongated approximately parallel to the dividing line 808 and to the directions in which the contact tabs 826 extend from the body 802 into the window 824.

The cable mating bodies 902, 904 and contact tabs 826 are oriented parallel with one another. For example, the cable mating body 902 and one of the contact tabs 826 may extend along the same direction while the cable mating body 904 and the other contact tab 826 extend along the same direction. As shown in FIG. 9, the cable mating body 902, conductive bridge 906, and one of the contact tabs 826 are oriented parallel to the cable mating body 904, conductive bridge 908, and the other contact tab 826. The cable mating body 902, conductive bridge 906, and one of the contact tabs 826 may be a unitary conductive body. For example, cable mating body 902, conductive bridge 906, and one of the contact tabs 826 may be stamped and formed from a common sheet of conductive material. Similarly, the cable mating body 904, conductive bridge 908, and the other contact tab 626 may be a unitary body. The body 802 may be overmolded onto and around the cable mating bodies 902, 904, the conductive bridges 906, 908, and the electrical component 900.

A height dimension 910 of the connector 800 is the distance between the mounting side 814 and the upper side 816 of the body 802 in a direction that extends transverse to the mounting side 814 and the upper side 816. In one embodiment, the height dimension 910 is measured in a direction approximately perpendicular to the mounting side 814 and the upper side 816. By way of example only, the height dimension 910 may be approximately 10 millimeters or less. In another embodiment, the height dimension 910 is approximately 8 millimeters or less.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An electrical connector comprising:
    a rigid body extending from an upper side to an opposite mounting side that are interconnected by a joining side and that is configured to be mounted to a first solar module, the rigid body framing a window that extends through the rigid body from the upper side to the mounting side;
    cable mating bodies disposed within the rigid body between the upper side and the mounting side of the rigid body, the cable mating bodies configured to electrically couple the first solar module with cables to communicate electric current generated in the first solar module with one or more of an electrical load or an additional solar module; and
    contacts joined to the cable mating body and extending into the window of the rigid body, wherein the contacts are arranged in the window to mate with module contacts to electrically couple the first solar module with the cable mating bodies.

2. The connector of claim 1, wherein the rigid body comprises placement features configured to be automatically engaged for placement of the rigid body on the first solar module so that the contacts are oriented with corresponding contacts on the first solar module.

3. The connector of claim 1, wherein the contacts are approximately coplanar with the mounting side in the window.

4. The connector of claim 1, wherein the contacts extend from the rigid body into the window in opposing directions.

5. The connector of claim 1, wherein the contacts extend from the rigid body into the window in approximately parallel directions.

6. The connector of claim 1, wherein the rigid body has a height dimension measured from the upper side to the mounting side that is approximately ten millimeters or less.

7. The connector of claim 1, wherein the rigid body comprises ports extending into the rigid body between the upper side and the mounting side, the ports configured to detachably receive the cables coupled to the one or more of the electrical load or the additional solar module in order to electrically couple the first solar module with the one or more of the electrical load or the additional solar module.

8. The connector of claim 7, wherein the rigid body comprises opposite ends extending between and interconnecting the upper side with the mounting side, further wherein the ports are disposed in the opposite ends.

9. The connector of claim 7, wherein the rigid body comprises a common end extending between and interconnecting the upper side with the mounting side, further wherein the ports are disposed in the common end.

10. The connector of claim 7, wherein the ports receive the cables in loading directions, the contacts extending from the rigid body into the window in directions parallel to the loading directions.

11. The connector of claim 7, wherein the ports receive the cables in loading directions, the contacts extending from the rigid body into the window in directions transverse to the loading directions.

12. The connector of claim 7, wherein the ports are recessed into the rigid body.

13. An electrical connector comprising:
a rigid body configured to be mounted to a first solar module having module contacts, the rigid body extending from a mounting side to an opposite upper side with the mounting side interconnected with the upper side by a joining side, the rigid body comprising ports recessed into the rigid body and configured to detachably receive cables coupled to one or more of an electrical load or an additional solar module;
cable mating bodies disposed within the rigid body, the cable mating bodies configured to be electrically joined with the cables to communicate electric current among the first solar module and the one or more of the electrical load or the additional solar module; and
contacts joined to the cable mating bodies and protruding out of the rigid body, the contacts configured to mate with the module contacts to electrically couple the first solar module with the cable mating bodies, wherein the rigid body comprises placement features configured to be engaged for automated placement of the rigid body on the first solar module so that the contacts are oriented with the module contacts on the first solar module.

14. The connector of claim 13, wherein the rigid body extends from an upper side to an opposite mounting side that is configured to be mounted to the first solar module, the placement features comprising a flat surface on the upper side that is configured to be engaged using an automated suction force to place the rigid body on the first solar module.

15. The connector of claim 13, wherein the rigid body comprises opposite sides extending transverse to the first solar module when the body is mounted thereto, further wherein the placement features comprise recesses in the opposite sides that extend into the rigid body and that are configured to receive extensions of a peripheral device to pick up the rigid body and place the rigid body on the first solar module.

16. The connector of claim 13, wherein the rigid body comprises opposite ends each including at least one of the ports recessed into the rigid body.

17. The connector of claim 13, wherein the rigid body comprises a common end disposed transverse to the first solar module when the body is mounted thereto, further wherein the ports are recessed into the rigid body on the common side.

18. The connector of claim 13, wherein the rigid body is formed as a unitary body.

19. The connector of claim 13, wherein the rigid body extends from an upper side to an opposite mounting side with the ports disposed between the upper side and the mounting side, the rigid body framing a window extending through the rigid body from the upper side to the mounting side, further wherein the contacts extend from the rigid body into the window to engage the module contacts.

20. The connector of claim 19, wherein the mounting side is configured to be mounted to the first solar module, further wherein the contacts extend into the window in a coplanar relationship with the mounting side.

21. The connector of claim 19, wherein the contact tabs extend from the rigid body in opposing directions.

* * * * *